Patented Nov. 11, 1947

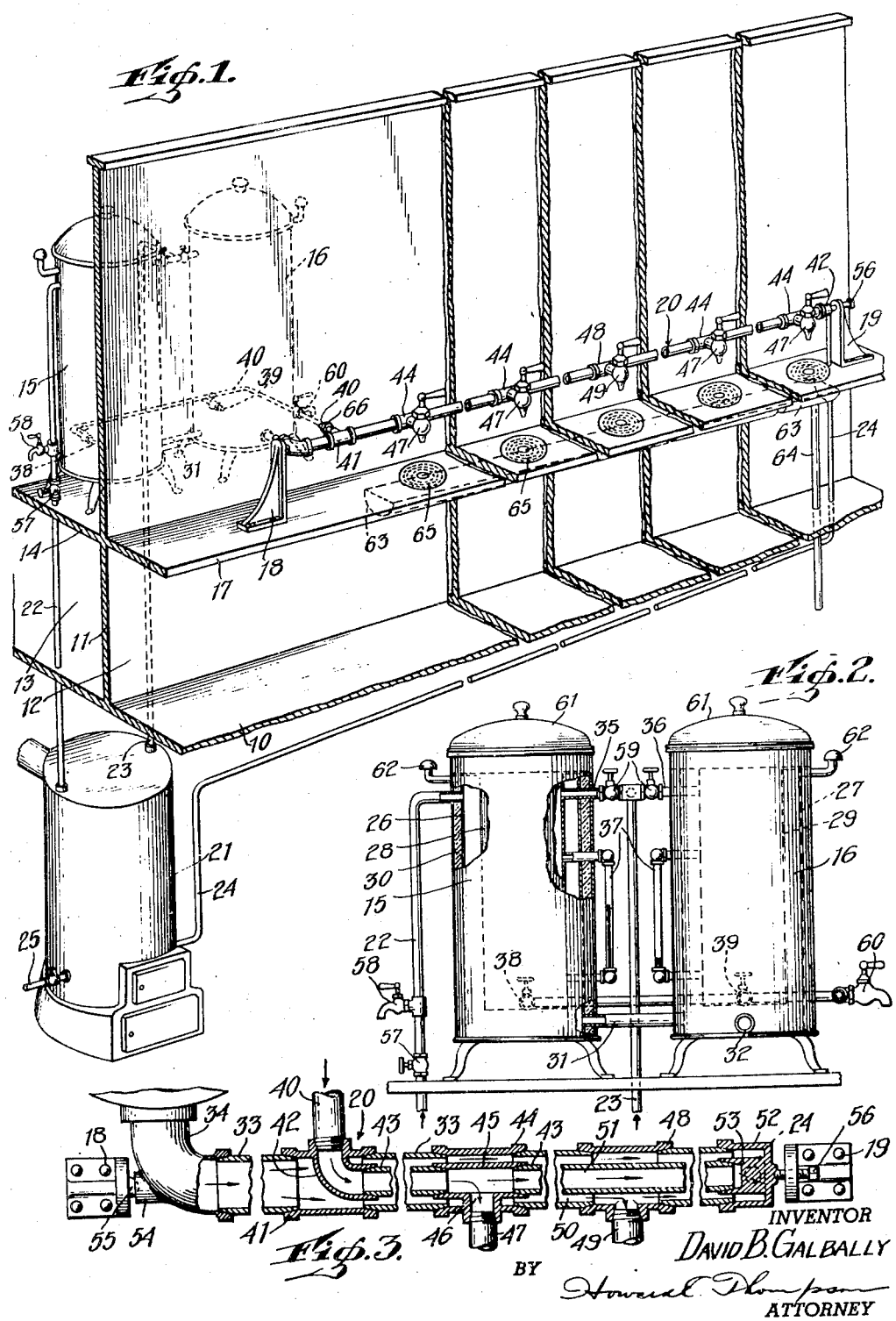

2,430,501

UNITED STATES PATENT OFFICE 2,430,501

COFFEE SERVICE APPARATUS

David B. Galbally, New York, N. Y.

Application November 20, 1943, Serial No. 511,162

6 Claims. (Cl. 225—21)

This invention relates to an apparatus for simplifying the serving of coffee in lunch rooms, cafeterias, restaurants, canteens, clubs and like public or group eating places. More particularly, the invention relates to an apparatus of the class defined wherein the water heater and coffee makers or urns are disposed in a room remote from or partitioned from the service room, and still more particularly, in distributing a plurality of coffee discharge valves or faucets along a serving counter or shelf, to render the same readily accessible to waiters or waitresses, or to others serving coffee, and also in including along the service line means for discharging hot water for the service of tea or other beverages requiring the use of hot water.

The novel features of the invention will be best understood from the following description, when taken together with the accompanying drawing, in which certain embodiments of the invention are disclosed, and in which the separate parts are designated by suitable reference characters in each of the views, and in which:

Fig. 1 is a diagrammatic view illustrating the general arrangement of the several parts of the apparatus and the positioning of the parts with respect to different rooms or compartments of a building or restaurant.

Fig. 2 is a detail view of the coffee makers or urns with parts of the construction broken away and in section; and Fig. 3 is a broken longitudinal sectional view, showing detail constructions of parts of the discharge faucets and other couplings employed in the water and coffee service feed line.

In the making, dispensing and serving of coffee, it has been the conventional practise in restaurants and other eating places of various types and kinds to employ one or more large coffee urns with associated hot water heaters disposed on the counter or shelf adjacent the service counter, and in the same room and environment of the patrons eating at a counter or on tables positioned in close proximity thereto.

This practise and method of procedure is objectionable from several standpoints. In the first place, it has necessitated the use of expensive urns composed of chrome plated stainless steel or other casings, to present an attractive appearance. It is further objectionable from a standpoint of having to daily polish and clean the exterior of these urns to maintain this attractive appearance. Further, this positioning of the urns has been objectionable from the standpoint of heat radiation and discharge of escaping steam or hot water which has been known to injure persons adjacent the urns, and lastly, this method of procedure has been highly impractical from the standpoint of congestion around the discharge faucet of the urn by waiters, waitresses or other service people, particularly at the busy periods of service, which brings about unnecessary delays in tying up these service people, and the further delay in serving the customer.

To overcome the foregoing and other objectionable features, I provide an apparatus which employs a long coffee dispensing tube having a plurality of discharge faucets spaced longitudinally of this tube, so as to distribute the point of discharge of coffee throughout a greater area of a service counter, thus minimizing the number of steps taken by the server, particularly in the delicate operation of serving coffee and similar hot drinks. Furthermore, in overcoming other objectionable features mentioned above, I dispose the hot water heater preferably in a room or compartment below the floor level of a room or compartment in which one or more of the coffee urns or makers are disposed, and in turn, these coffee urns or makers are arranged in a room apart from, and partitioned from the service room in which the water and coffee feed pipe or tube is arranged.

It will thus be apparent, that these coffee makers or urns can be constructed of more inexpensive materials, particularly from the standpoint of finish, and will preferably be jacketed by insulating material to retain the heat of the coffee, and to minimize on fuel consumption in maintenance of this heat.

It is also a feature of my invention to employ a delivery or feed line, composed of a series of more or less standardized couplings or fittings for the respective connections to be made, as well as for the faucets, and a simple method of uniting the tubes disposed between the couplings, so as to facilitate periodic cleaning of this feed line.

In Fig. 1 of the drawing, I have, in a very diagrammatic fashion, illustrated the floor and other partition structures in illustrating the general arrangement and installation of my complete apparatus or dispensing unit. For example, 10 represents a floor upon which is erected a wall or partition 11, which divides the space above the floor into a service room 12, behind which is a storage or other space or room 13.

On the wall 11 is erected a suitable shelf 14, for supporting one or more coffee and water service urns, one being shown at 15, and the other at 16, in the accompanying drawing. Also erected on the wall 11 in the service room, and preferably extending along a service counter is another shelf 17, having at longitudinally spaced intervals brackets 18, 19 for supporting a water and coffee service line generally identified by the reference character 20, and more specifically defined below. In a room or compartment below the floor 10 is arranged a suitable water heater 21, which may be fired in any desired manner.

From this heater are two water feed pipes 22, and 23, and at 24 is shown a return pipe which couples with the end of the line 20, and at 25 is a water supply pipe to the heater 21. At this time, it may be well to point out that in certain types and kinds of installation, the water heater may as usual be arranged adjacent the coffee urn, and have direct or indirect couplings with the coffee urn as in other apparatus of this kind, now in common use.

Each urn is divided into an outer water chamber or jacket 26, 27, and an inner coffee tank 28 and 29. The outer casing of both urns being insulated, as indicated for example at 30, in conjunction with the urn 15 of Fig. 2 of the drawing.

The pipe 22 extends upwardly and is coupled with the upper portion of the water chamber 26, and this chamber is placed in communication with the chamber or jacket 27 by a by-pass pipe or coupling 31 at the lower portion of these chambers. At 32 is shown a discharge pipe communicating with the chamber 27 of the urn 26, and placed in communication with the outer tube 33 of the service or dispense line 20 through an elbow or similar coupling 34, note Fig. 3 of the drawing.

The feed pipe 23 also extends to the upper portion of both urns, and has valve controlled communications 35 and 36 with the upper portions of the coffee tanks 28, 29 respectively. Suitable gauges 37 are also in communication with the coffee tanks 28 and 29, as in other devices of this kind. Communicating with the lower portions of each of the coffee tanks 28, 29 are valve controlled discharge pipes 38 and 39, both of which communicate with a single pipe 40, which in turn is coupled with one of the feed line couplings 41. This coupling 41 includes an internal elbow 42 for directing the coffee to the inner tube 43 of the feed line 20.

At this time, the tubes 33 and 43 are generally identified as a single tube, whereas these tubes are actually broken up into a series of independent sections which have bevel ground joints seating in the respective couplings or fittings, which are employed so that the entire assemblage may be quickly taken down and re-assembled for cleaning, repairs or other purposes. In this connection, and in some uses of the invention, the various tube sections 33 and 43 may be composed of suitable transparent materials, so that to display to the customer or patron the clear amber color of good coffee, as contained in the feed or delivery line 20, particularly intermediate the spaced fittings or couplings employed.

In the line 20 are arranged a plurality of similar fittings 44, four of which are indicated for illustrative purposes in the diagrammatic showing in Fig. 1, and one of these fittings is shown in detail in Fig. 3. These fittings in addition to having seats for the outer tube sections 33 also have inner tube portions 45 joining the outer casings in suitable web structures and through the discharge passage 46, and form seats for the inner tube sections 43. Coupled with and communicating with the discharges 46 are the discharge valves or faucets 47.

Along the feed or delivery line 20 may be one or more other fittings 48, one of which is shown in Figs. 1 and 3, which differ from the fittings 45, simply in dispensing with the inner tube portion 45, and having the discharge valve or faucet 49 communicating directly with the water chamber or jacket 50, which surrounds the tube sections 43 within which is the coffee chamber 51.

At the extreme end of the feed or delivery line 20 is another plug fitting 52, which forms first a closure for the coffee tube sections 43, as seen at 53, and also the coupling for the return pipe 24. Thus providing a continuous circulation of the hot water through the jacket 50, as well as through the two urns to maintain the coffee at the proper temperature at all times.

The coupling or fitting 34 has a protruding recessed or socket portion 54, for receiving a projecting knob or centering member 55 on the bracket 18, whereas the screw 56 is mounted in the bracket 19, and operates upon the fitting 52 to draw all of the tube sections and fittings into firm engagement with each other. In some instances, it may be desirable to employ conventional packings between the ends of the tube sections and the fittings, but in other instances, the ground joint coupling would be sufficient, and from this standpoint, no further details in construction are illustrated.

In the water supply line 22 is arranged a valve 57, and also in this line is a hot water discharge faucet 58. The water supply from the line 23 is controlled by independent valves 59 in the pipes 35, 36. In addition to the valve control discharges 38 and 39 for the discharge of coffee into the feed line 40, a discharge faucet 60 is included in the line 40, preferably behind the partition 11, so as to provide a convenient discharge from either of the tanks or urns 28, 29 in re-pouring the coffee in the process of making the same.

Other details of construction of the urns are omitted, with the exception that the usual removable covers are shown at 61, and the steam vents or pressure discharge valves are indicated at 62.

Arranged along and beneath the service shelf 17 is a drain troth 63, which is inclined to the right, as seen in Fig. 1, and has at its lower end a drain pipe 64, leading to a suitable discharge. Disposed in the shelf 17 beneath each of the faucets 47—49 are drains 65, which are arranged above the troth 63 to drain off any drippings that may prevail from the discharge faucets.

With an apparatus of the kind under consideration, it will be apparent that coffee, after it has been made in either or both of the urns, may be quickly dispensed or served from the several faucets 47 spaced along the feed or service line 20, and positioned over the shelf and the drain 65, so as to facilitate the free insertion and removal of a cup and saucer placed beneath the respective faucets. If coffee is being brewed in one of the urns, the valve discharge of such urn will be shut off, and supply to the feed line will be cared for by the single urn.

The hot water circulating through the jacket 50 and around the coffee supply line 51 will maintain the coffee hot at all times in delivery from the several spaced discharge faucets. At the same time, the faucet 49 or a number of these faucets spaced along the line 20 may be utilized for the supply of hot water in the preparation of tea, chocolate or other beverages, or in service of hot water for any purpose whatever. It will be understood that when the apparatus has served its purpose in any one day, hot water may be circulated through the entire coffee system. That is to say, the tanks 28, 29, the discharges 38, 39, 40, and through the feed chamber 51 in the tubes 43, also circulating this water through the several discharge faucets 47, so that from day to day, the entire system may be kept in condition for reuse. Periodically, and as may be required, the various tube sections and the fittings may be disassembled and thoroughly cleaned and re-assembled.

In the above operation, a suitable coupling 66 can be provided in the pipe 40, so as to facilitate separation of the end tube section 33 between the fittings 34 and 41.

While the system or apparatus layout lends itself to what is commonly referred to as counter service, the same effectiveness from a time saving standpoint will take place in large restaurants, by providing the multiplicity of space discharges and in some instances, these discharges may actually be disturbed throughout the dining room area to provide quick or more or less instantaneous service of coffee to the patrons in different parts or sections of the dining room. However, in other uses of the invention, such as in cafeterias, canteens and the like, wide distribution of discharges will expand the self-service of coffee, as will be apparent.

It will also be understood that the size of the feed line in preparation of the several discharges and the pressure on the line will be proportioned to suit requirements in various installations.

While the invention has been described as to one specific use of the apparatus, namely, in the brewing or preparation of coffee, and in dispensing or servicing of coffee along the feed line in which is arranged the spaced discharge or service stations, it will be understood that the apparatus is adaptable for other uses in providing spaced discharge stations along a feed tube for any type and kind of fluid, and particularly in providing along said feed line means controlling the temperature of the fluid discharged.

In the present illustration, heat is a desirable factor. However, in other instances, chilling or cool temperatures may be desirable.

It will also be understood that in some installations and uses, the coffee urns may be maintained in the same room and environment as the feed line, particularly where the positioning of the urn in the restaurant will not be objectionable.

Having fully described my invention, what I claim as new and desire to secure by Letters Patent is:

1. An elongated coffee feed line for service room of a restaurant or similar establishment, said feed line comprising inner and outer tube sections, fittings arranged between and coupling adjacent sections, end fittings on end sections, means clamping said tube sections and fittings together in forming said feed line, a plurality of said fittings having inner and outer tubular portions engaging inner and outer tube sections, a source of coffee supply, one of said fittings having means communicating with said source of coffee supply for introducing coffee into one of the tube sections, other fittings having means communicating with said coffee tube section for discharging coffee from the feed line at longitudinally spaced intervals controlled by position of said last named fittings in said feed line, means forming a supply of a heating medium, and said end fittings having means for circulating a heating medium from said supply means through the other tube section throughout the length of said feed line to maintain the coffee of the first tube section heated.

2. An elongated coffee feed line for service room of a restaurant or similar establishment, said feed line comprising inner and outer tube sections, fittings arranged between and coupling adjacent sections, end fittings on end sections, means clamping said tube sections and fittings together in forming said feed line, a plurality of said fittings having inner and outer tubular portions engaging inner and outer tube sections, a source of coffee supply one of said fittings having means communicating with said source of coffee supply for introducing coffee into one of the tube sections, other fittings having means communicating with said coffee tube section for discharging coffee from the feed line at longitudinally spaced intervals controlled by position of said last named fittings in said feed line, means forming a supply of a heating medium said end fittings having means for circulating a heating medium from said supply means through the other tube section throughout the length of said feed line to maintain the coffee of the first tube section heated, and one of said fittings having means for discharging the heating medium from the last named tube section.

3. An elongated tubular supply line for dispensing fluids, said supply line comprising inner and outer tube sections, fittings at the ends of and joining adjacent sections, one end fitting comprising an elbow contacting one end of an outer tube section, means connected with the elbow for supplying a heating medium to the outer tube sections of said line, the other end fitting having means engaging inner and outer tube sections and having a discharge for the heating medium in the outer tube section, a fitting adjacent the first named end fitting having means engaging one end of the inner tube section, said last named fitting having means for introducing a fluid from a source supply into said inner tube section, other fittings in said line, and fittings between said end fittings having means engaging both inner and outer tube sections, said last named fittings having means for discharging the fluid from the inner tube section, and means engaging said end fittings for clamping all of said sections and fittings in engagement with each other for quick attachment and detachment.

4. An elongated tubular supply line for dispensing fluids, said supply line comprising inner and outer tube sections, fittings at the end of and joining adjacent sections, one end fitting comprising an elbow contacting one end of an outer tube section, means connected with the elbow for supplying a heating medium to the outer tube sections of said line, the other end fitting having means engaging inner and outer tube sections and having a discharge for the heating medium in the outer tube section, a fitting adjacent the first named end fitting having means engaging one end of the inner tube section, said last named fitting having means for introducing a fluid from a source supply into said inner tube section, other fittings in said line, and fittings between said end fittings having means engaging both inner and outer tube sections, said last named fittings having means for discharging the fluid from the inner tube section, means engaging said end fittings for clamping all of said sections and fittings in engagement with each other for quick attachment and detachment, another of said fittings contacting outer tube sections only, and said last mentioned fitting having means for discharging the heating medium from the outer tube section intermediate the end sections.

5. An elongated tubular supply line for dispensing fluids, said line comprising inner and outer tube sections, end fittings and intermediate fittings for said sections, means engaging end fittings, for clamping all of the sections and fittings together for quick attachment and detachment in assembling and disassembling said supply line, one end fitting engaging an outer tube section only and having means introducing fluid from a source of supply into the outer tube section, the other end fitting engaging inner and outer tube sections and having means for discharging fluid from said outer tube section, one intermediate fitting having means for introducing a fluid from a source of supply to the inner tube sections of the supply line, other intermediate fittings having means engaging both inner and outer tube sections, and said last named intermediate fittings having means for discharging fluid from the inner tube sections of the line at stations spaced longitudinally of the line.

6. An elongated tubular supply line for dispensing fluids, said line comprising inner and outer tube sections, end fittings and intermediate fittings for said sections, means engaging end fittings for clamping all of the sections and fittings together for quick attachment and detachment in assembling and disassembling said supply line, one end fitting engaging an outer tube section only and having means introducing fluid from a source of supply into the outer tube section, the other end fitting engaging inner and outer tube sections and having means for discharging fluid from said outer tube section, one intermediate fitting having means for introducing a fluid from a source of supply to the inner tube sections of the supply line, other intermediate fittings having means engaging both inner and outer tube sections, said last named intermediate fittings having means for discharging fluid from the inner tube sections of the line at stations spaced longitudinally of the line, and another intermediate fitting having means for discharging fluid from the outer tube section at a station intermediate the end fittings.

DAVID B. GALBALLY.

REFERENCES CITED

The following references are of record in the file of this patent:

UNITED STATES PATENTS

| Number | Name | Date |
|---|---|---|
| 1,981,171 | Greenwald et al. | Nov. 20, 1934 |
| 2,321,906 | Gair | June 15, 1943 |
| 1,237,357 | Maker | Aug. 21, 1917 |
| 423,127 | Childs | Mar. 11, 1890 |
| 1,473,898 | Bossini | Nov. 13, 1923 |
| 1,369,595 | Wood | Feb. 22, 1921 |